United States Patent [19]

Nigawara et al.

[11] Patent Number: 4,905,632
[45] Date of Patent: Mar. 6, 1990

[54] SAFEGUARD ARRANGEMENT FOR PLANT

[75] Inventors: Seiitsu Nigawara; Takehiko Ikematsu; Masayuki Fukai, all of Hitachi, Japan

[73] Assignee: Hitachi, Ltd., Tokyo, Japan

[21] Appl. No.: 240,193

[22] Filed: Sep. 6, 1988

[30] Foreign Application Priority Data

Sep. 9, 1987 [JP] Japan .................. 62-223944
Oct. 21, 1987 [JP] Japan .................. 62-263841

[51] Int. Cl.⁴ ............................................ F22B 37/42
[52] U.S. Cl. .................................. 122/504.2; 110/193
[58] Field of Search ................... 122/504, 504.1, 504.2, 122/507; 110/193; 431/13

[56] References Cited

U.S. PATENT DOCUMENTS 3,137,279 6/1964 Montgomery et al. ............. 122/504
3,196,814 7/1965 Hahn et al. ......................... 110/193
3,218,997 11/1965 Berghout et al. ............... 110/193 X
4,295,129 10/1981 Cade ............................... 110/193 X Primary Examiner—Edward G. Favors
Attorney, Agent, or Firm—Antonelli, Terry & Wands

[57] ABSTRACT

A safeguard arrangement for a plant, which comprises a plant auxiliary provided with a lid and so designed that the lid is opened for maintenance of the inside thereof, switching means installed on a piping connected to said plant auxiliary, and driving means to give a driving output to the switching means in response to an opening or closing instruction signal for said switching means, and which is employed when operations for maintenance of the aforesaid plant auxiliary are executed, is provided additionally with lid opening detecting means to detect the opening of the lid of the aforesaid plant auxiliary or the release of locking means thereof, in gearing with either of them, and checking means to check the opening of the aforesaid switching means on the basis of the opening instruction signal for the switching means when it is detected by said lid opening detecting means that the lid is opened or to be opened.

6 Claims, 8 Drawing Sheets

SAFEGUARD ARRANGEMENT FOR PLANT

BACKGROUND OF THE INVENTION

The present invention relates to a safeguard arrangement for a plant, and particularly to a safeguard arrangement for a plant for securing the safety of personnel for maintenance when a test with any people being admitted or maintenance is executed.

In a plant such as a thermal power plant, the inspection and maintenance of plant auxiliaries are conducted properly for maintaining sound operations of the plant, and it is indispensable, on the occasion, to secure the safety of the maintenance personnel in terms of both mind and body thereof. A sudden motion of some peripheral apparatus in the course of the maintenance, for instance, frightens the personnel, and also exposes them to serious danger, just causing casualty in some cases, when they work at a height. Such matters as stated above must be avoided without fail.

On the occasion of maintenance of plant auxiliaries, therefore, warning tags for prohibiting operations are usually put on the operation switches of said auxiliaries and the peripheral apparatuses so as to prevent the erroneous operation of said switches by any operator other than the maintenance personnel concerned. Besides, a process control system is known wherein the delivery of a control instruction from a process control unit to a process apparatus is prohibited by operating a switch for maintenance and inspection provided in a process input/output device on the occasion of the maintenance and inspection of the process control system, as described in Japanese Patent Laid-Open No. 91507/1984.

Among the plant auxiliaries, there are units, such as a condenser waterbox, a feed water heater, a coal pulverizer, a fan, a motor and a pump, which have a so-called lid, such as a manhole, a hatch or a cover, which is opened for internal on-the-spot maintenance. In many cases, moreover, a plurality of these auxiliaries are installed in juxtaposition to obtain a prescribed output, and therefore it sometimes happens that a part of the auxiliaries is stopped and subjected to the maintenance while a partial loaded operation is executed. On the occasion of the maintenance of the stopped auxiliary, apparatuses on the entrance and exit sides thereof are closed, a rotary machine is stopped, the inflow of a fluid is checked, and the fluid located inside is discharged, before the maintenance is executed. However, if an apparatus on the entrance or exit side is opened on the rotary machine is driven erroneously on the occasion, a great injury is to be inflicted on the personnel working inside.

In terms of the safeguard regarding such auxiliaries as mentioned above, the method relying on the manual operations of the warning tag for prohibiting operation and the switch for maintenance and inspection according to the above-described prior art can not eliminate the possibility of forgetting to set the warning tag, to operate the switch for maintenance and inspection, or the like, and it can also be imagined that an operation switch is operated erroneously by a person not knowing that a given auxiliary is under maintenance. These failures cause the problem that the maintenance personnel are imperiled by the operation of the auxiliary under maintenance or a related apparatus.

SUMMARY OF THE INVENTION

As is seen from the above description, an object of the present invention is to prevent the personnel engaged in the maintenance of a plant apparatus from being imperiled by unexpected motion of the plant apparatus due to an erroneous operation.

The aforesaid object is attained by providing a lid opening detector which detects whether a lid, such as a cover, a hatch or a manhole, to be opened for entrance into a plant auxiliary on the occasion of the maintenance thereof is opened or not, and by delivering a signal to prohibit the operation of the plant auxiliary or an attached apparatus located in the corresponding spot when it is detected by said detector that the cover, the hatch or the manhole is opened.

DETAILED DESCRIPTION OF THE PREFERRED EMBODIMENTS

An embodiment of the present invention will be described hereunder, taking a thermal power plant as an example and using FIGS. 1 to 13.

Figure 1:
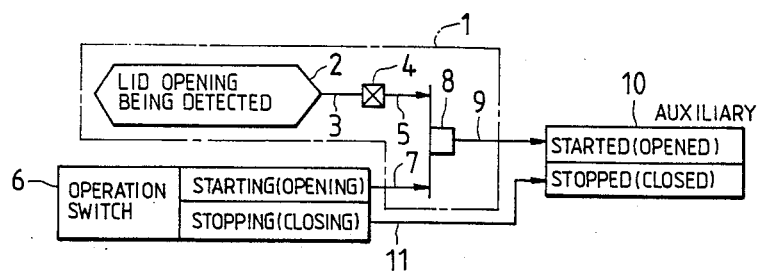
FIG. 1 shows a fundamental construction of the present invention.

FIG. 1 shows a fundamental construction of a safeguard arrangement 1. In this arrangement, a lid opening detector 2 detecting that a lid, such as a cover, a hatch or a manhole, is opened is provided, an opening detection signal 3 from said detector 2 is inverted by an NOT circuit 4, an operation permission signal 5 thus obtained and a starting (opening) operation signal 7 from an operation switch 6 are given to an AND circuit 8, and an auxiliary 10 is started by an output signal 9 only when the aforesaid operation permission signal 5 and the aforesaid starting (opening) operation signal 7 are effectuated simultaneously. Interlocking of the lid opening detection signal 3 is not necessary for a stop (closure) side signal of the operation switch 6.

Figure 2:
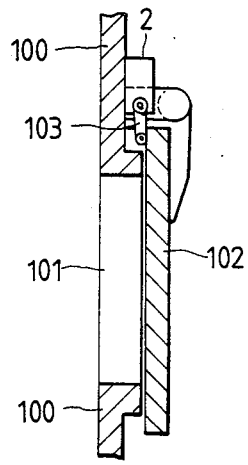
FIGS. 2 and 3 show an example of installation of a maintenance state detector for a manhole.
Figure 3:
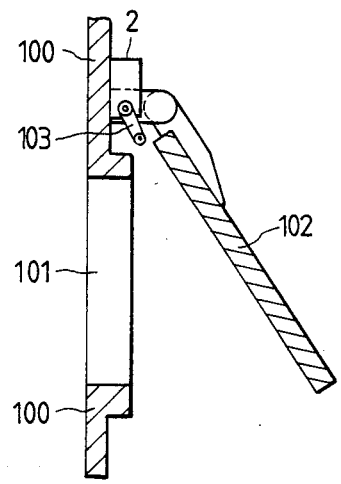

FIGS. 2 and 3 show an example of installation of a cover opening detector in a manhole. In this figure, numeral 100 denotes a part of the wall of a plant auxiliary 10. A cover 102 being opened (FIG. 3), maintenance personnel go in and out through a manhole 101. The cover 102 is fitted rotably to the wall 100, and a lever 103 of the cover opening detector 2, e.g. a microswitch, fixed on the wall 100 and a part of the cover 102 engage with each other so as to detect the opening of the cover 102. FIG. 2 shows the state wherein the manhole cover 102 is closed. In this case, the lever 103 of the cover opening detector 2 is pressed by the manhole cover 102, and the detector 2 does not deliver an output. FIG. 3 shows the state wherein the manhole cover 102 is opened, and the lever 103 of the cover opening detector 2 is released in this case. Judging from the state that the lever 103 is released, the cover opening detector 2 determines the plant auxiliary 10 to be in the state of maintenance and delivers an output. While the opening is detected from the engagement of the rotating manhole cover with the microswitch in this example, adequate detecting means other than the above can also be adopted. In addition, while the opening of the cover is detected in this case, it is also effective to determine the opening from the disengagement of an opening locking mechanism fitted to the cover and to deliver an output on the basis of the determination.

Figure 4:
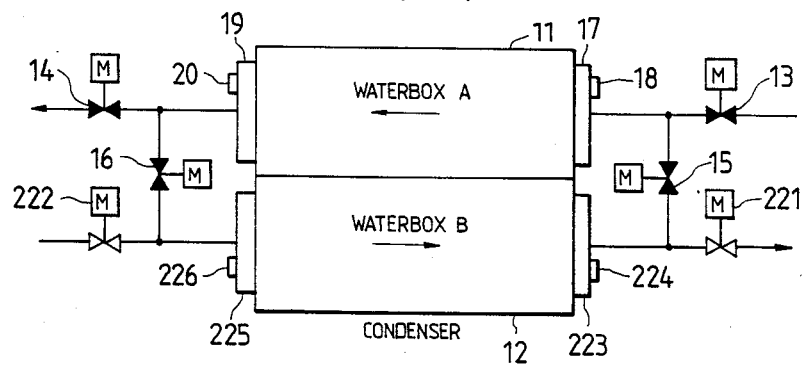
FIG. 4 is a system diagram related to a condenser.

The following is a description of a concrete embodiment of the present invention. FIG. 4 shows an example wherein condenser waterboxes 11 and 12 of a thermo-electric power plant are cited as plant auxiliaries. The degree of vacuum of a condenser under a rated load is maintained at a prescribed value by using the two waterboxes 11 and 12, and in this state, valves 13, 14, 221 and 222 are opened, while valves 15 and 16 are closed. Moreover, cooling water such as seawater is made to flow in the directions of arrows shown in the figure, and thereby turbine exhaust not shown in the figure is cooled down to be condensed.

While the maintenance of these waterboxes is conducted also with the plant stopped for a long term as is the case with periodical inspection, a higher degree of danger is brought about when one of them is subjected to maintenance while the other is operated, with a plant output halved. These conditions increase the possibility of erroneous operation of valves and the like related to the stopped waterbox. In order to subject the waterbox A 11 to maintenance while leaving the waterbox B 12 operated in this figure, for instance, all of a waterbox A inlet valve 13, a waterbox A outlet valve 14, a waterbox bypass valve 15 and a waterbox bypass valve 16 are put beforehand in a full-closed state so as to isolate the waterbox A 11 from the cooling water flowing through the waterbox B 12 and from the one flowing on the upstream side of the waterbox A inlet valve 13 and on the downstream side of the A outlet valve 14, and the cooling water in the waterbox A 11 is discharged. On the occasion when the waterbox A 11 is subjected to maintenance actually, any of a waterbox A entrance cover 17, a waterbox A entrance manhole 18, a waterbox exit cover 19 and a waterbox A exit manhole 20 is opened, and maintenance personel enter a maintenance spot therethrough.

In this figure, numeral 222 denotes an inlet valve on the waterbox B side, 221 an outlet valve, 224 and 226 waterbox manholes, and 223 and 225 waterbox covers, and cover opening detectors are fitted to all of the manholes and covers respectively.

Figure 5:
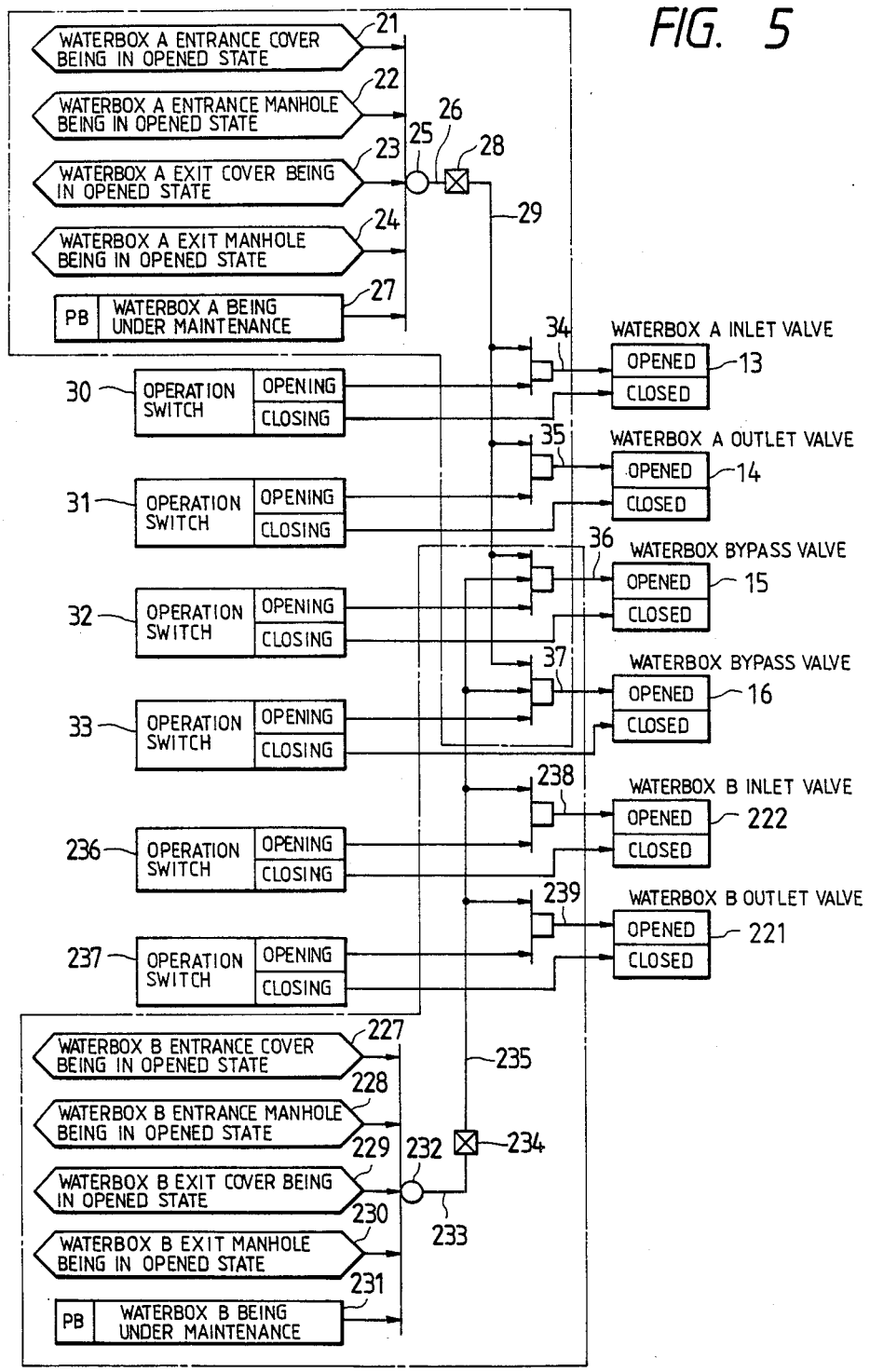
FIG. 5 shows an example of application of a safeguard arrangement to a condenser waterbox.

FIG. 5 shows an example of application of a safeguard arrangement in the maintenance of the condenser waterbox A 11 shown in FIG. 4. Cover opening detectors 21, 22, 23 and 24 are provided for a waterbox A entrance cover 17, a waterbox A entrance manhole 18, a waterbox A exit cover 19 and a waterbox A exit manhole 20 respectively, and a waterbox A maintenance signal 26 is effectuated by an OR circuit 25 when any one of said detectors 21, 22, 23 and 24 detects the state of maintenance. Besides, a push button 27 for signaling the waterbox A being under maintenance, or the like, which is operated by maintenance personnel on the spot at the start of the maintenance may also be provided in addition to the aforesaid detectors.

In the case when the waterbox A maintenance signal 26 is effectuated, a waterbox A operation permission signal 29, which is obtained by inverting said maintenance signal 26 by an NOT circuit 28, is not effectuated. Therefore, opening operation instruction signals 34, 35, 36 and 37 for a waterbox A inlet valve 13, a waterbox A outlet valve 14, a waterbox bypass valve 15 and a waterbox bypass valve 16 are not effectuated even if any of operation switches 30, 31, 32 and 33 corresponding to said valves 13, 14, 15 and 16 respectively is operated for opening, and consequently all of the aforesaid valves 13, 14, 15 and 16 do not make opening operation. An identical opening operation prohibiting circuit may also be provided for an automatic opening operation circuit, such as a sequencer, as well as for the aforesaid operation switches 30, 31, 32 and 33. In this case, the switches 30 to 33 may be regarded as the automatic opening operation circuit such as the sequencer. Moreover, the state that the waterbox A 11 is under maintenance currently may be shown by an indication lamp provided on each of the operation switches 30, 31, 32 and 33, or on a display screen of a computer, in response to the waterbox A maintenance signal 26, so as to inform an operator that the part concerned is under maintenance.

In the same way as in the case of the above-stated waterbox A 11, a safeguard arrangement for maintenance of the waterbox B 12 is constructed as follows. A waterbox B entrance cover 225, a waterbox B entrance manhole 226, a waterbox B exit cover 223 and a waterbox B exit manhole 224 of FIG. 4 are provided with cover opening detectors 227 to 230 (FIG. 5) respectively, and when any one of said detectors 227 to 230 detects the state of maintenance, a waterbox B maintenance signal 233 is effectuated by an OR circuit 232. Besides, a push button 231 for signaling the waterbox B being under maintenance, which is operated by maintenance personnel on the spot at the start of the maintenance, is also provided in addition to the aforesaid detectors 227 to 230.

In the case when the waterbox B maintenance signal 233 is effectuated, a waterbox B operation permission signal 235, which is obtained by inverting the aforesaid maintenance signal 233 by an NOT circuit 234, is not effectuated. Therefore opening operation instruction signals 238, 239, 36 and 37 for a waterbox B inlet valve 222, a waterbox B outlet valve 221, the waterbox bypass valve 15 and the waterbox bypass valve 16 are not effectuated even if any of operation switches 236, 237, 32 and 33 corresponding to said valves 222, 221, 15 and 16 respectively is operated for opening, and consequently all of the aforesaid valves 222, 221 15 and 16 do not make opening operation.

According to the present embodiment, the opening operation of all the valves 13, 14, 15 and 16 connected to the waterbox A 11 can be prohibited during the maintenance of the waterbox A 11. Even if any of the operation switches 30, 31, 32 and 33 is operated for opening erroneously by an operator or if the central sequencer (computer) outputs an opening signal by any reason, therefore, the inflow of cooling water into the waterbox A 11 can be prevented, and this produces an effect that such a personal accident as maintenance personnel being immersed in water or drowned to death is prevent from occurrence. During the maintenance of the waterbox B, likewise, the opening operation of all the valves 222, 221, 15 and 16 connected to the waterbox B 12 can be prohibited, and therefore the inflow of the cooling water into the waterbox B 12 can be prevented, even if any of the operation switches 236, 237, 32 and 33 is operated for opening erroneously by the operator. The characteristic feature of this embodiment is that the valves 15 and 16 bypassing the two waterboxes are locked in the maintenance of either of the waterboxes since they are common to the two.

Figure 6:
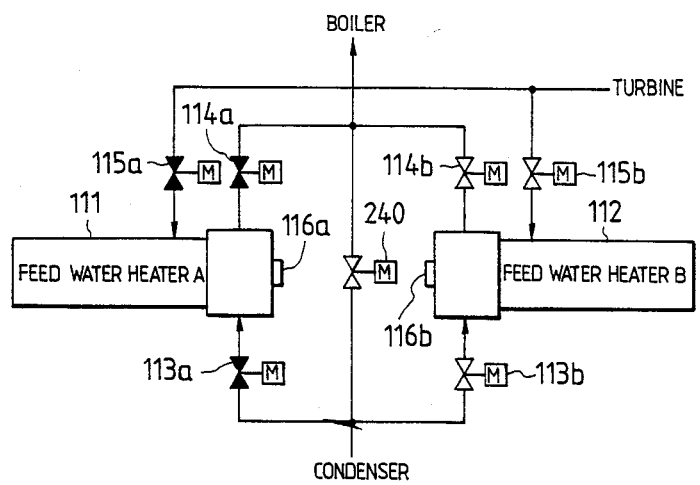
FIG. 6 is a system diagram related to a feed water heater.

FIG. 6 shows a system of feed water heaters 111 and 112 which are plant auxiliaries, and feed water from a condenser can be supplied to a boiler through three routes, the two feed water heaters 111 and 112 installed in juxtaposition and a bypass valve 240 opened during the operation of the heaters. These feed water heaters are given an extracted steam from a turbine through an extraction stop valve 115 and heat the feed water. Numeral 113 denotes a feed water inlet valve and 114 a feed water outlet valve. In this case, a system A consisting of 111, 114a, 115a and 113a and a system B consisting of 112, 114b, 115b and 113b are independent of each other, and there is no apparatus that must be locked when either of the systems is subjected to maintenance, as is the case with the example of FIG. 4. Therefore, a description will be made hereunder only on the system A, and the one on the system B will be omitted.

In order to subject the feed water heater A 111 to maintenance while leaving the feed water heater 112 in the state of operation, in the present feed water system, the feed water heater A feed water inlet valve 113a, the feed water heater A feed water outlet valve 114a and the feed water heater A extraction stop valve 115a are put in a full-closed state, while other valves are put in an opened state, and thereby the feed water heater 111 is isolated from the feed water and extracted steam flowing in and out of the feed water heater B 112. When the feed water heater A 111 is put under maintenance, a feed water heater A manhole 116a is opened, and maintenance personnel enter the spot of maintenance therethrough.

Figure 7:
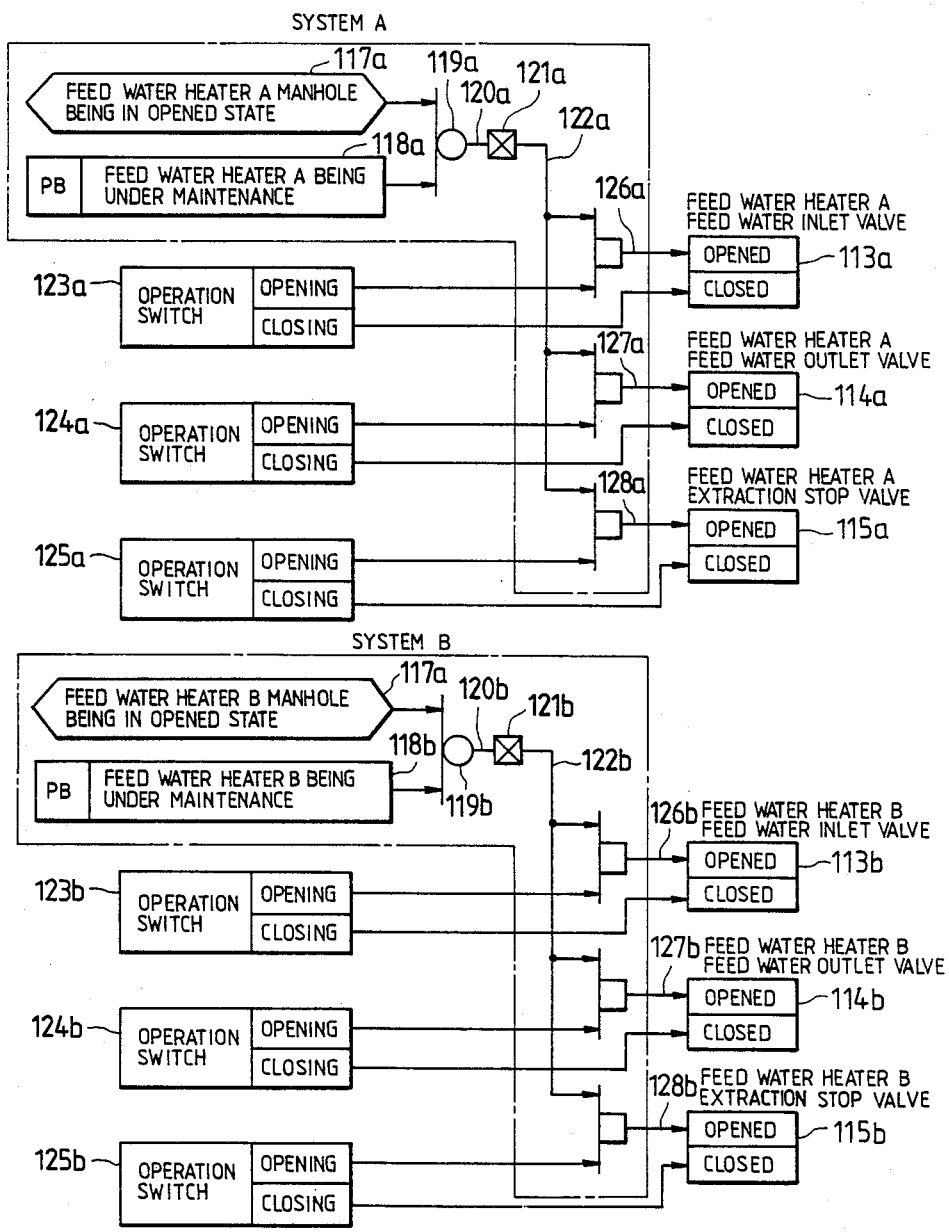
FIG. 7 shows an example of application of the safeguard arrangement to the feed water heater.

FIG. 7 shows an example of application of the safeguard arrangement in the maintenance of the feed water heaters shown in FIG. 6, and a description will be made only on the maintenance of the system A. The feed water heater A manhole 116a is provided with a cover opening detector 117a, and a feed water heater A maintenance signal 120a is effectuated by an OR circuit 119a when the state of maintenance is detected by said detector 117a or when a push button 118a for signaling the feed water heater A being under maintenance is operated on the spot by maintenance personnel. Said push button 118a may not be provided. In the case when the feed water heater A maintenance signal 120a is effectuated, a feed water heater A operation permission signal 122a, which is obtained by inverting said maintenance signal 120a by an NOT circuit 121a, is not effectuated. Therefore opening operation instruction signals 126a, 127a and 128a for the feed water heater A feed water inlet valve 113a, the feed water heater A feed water outlet valve 114a and the feed water heater A extraction stop valve 115a are not effectuated even if any of operation switches 123a, 124a and 125a corresponding to said valves 113a, 114a and 115a respectively is operated for opening, and consequently all of the aforesaid valves do not make opening operation. Besides, interlocking of a cover opening detection signal for an operation signal for closure of the operation switches 123a, 124a and 125a is unnecessary.

According to the present embodiment, the opening operation of all the valves connecting to the feed water heater A 111 can be prohibited during the maintenance of the feed water heater A. Even if any of the operation switches 123a, 124a and 125a is operated for opening erroneously by an operator, accordingly, the inflow of feed water or an extracted steam into the feed water heater A 111 can be prevented, and this produces an effect that such a personal accident as maintenance personnel being burnt, scalded or drowned to death by the feed water or extracted steam of high temperature and high pressure is prevented from occurrence.

Figure 8:
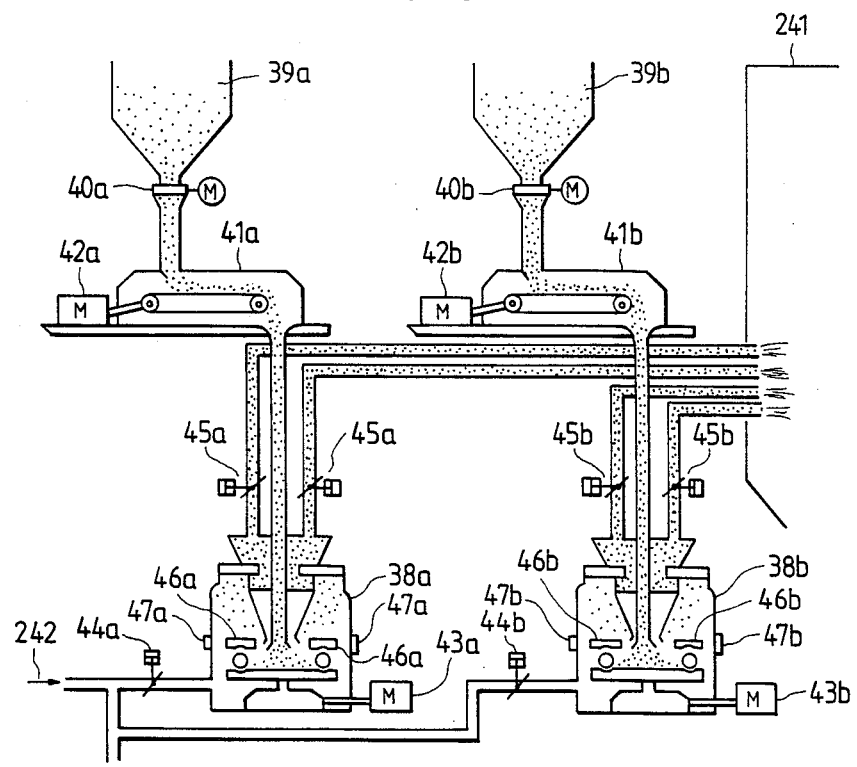
FIG. 8 is a system diagram related to a coal pulverizer.

FIG. 8 shows an example of a coal pulverizer as a plant auxiliary. Herein the coal pulverizer 38 is an apparatus for supplying pulverized coal as a fuel to a boiler 241. One boiler 241 is provided with a plurality of coal pulverizers 38, and the coal supplied from a coal feeder 41 is crushed by a rotor into pulverized coal, and then the pulverized coal is supplied to the boiler by carrier air 242. The figure shows an example of a coal pulverizer having two systems of a and b. In order to subject the inside of a coal pulverizer 38a of the system a to maintenance while leaving a coal pulverizer 38b of the system b in the state of operation, in the coal pulverizer 38 stated above, a coal gate 40a checking the flow of coal from a coal bunker 39a into a coal feeder 41a is closed, a coal feeder motor 42a for casting coal from the coal feeder 41a into the coal pulverizer 38a is stopped, a coal pulverizer motor 43a for pulverizing the coal cast in from the coal feeder 41a is stopped, a primary air damper 44a checking the inflow of hot primary air 242, the carrier air, into the coal feeder 41a is closed, and a coal pulverizer outlet damper 45a checking the backflow of a flame in a furnace and that of pulverized coal from another coal pulverizer is closed so that the coal pulverizer 38a be isolated from the coal, primary air, flame and pulverized coal flowing thereinto, and a rotor 46a in the coal pulverizer 38a is stopped. On the occasion when the inside of the coal pulverizer 38a is subjected to maintenance, any of coal pulverizer hatches 47a provided in a plurality is opened, and maintenance personnel enter the spot of maintenance therethrough.

Figure 9:
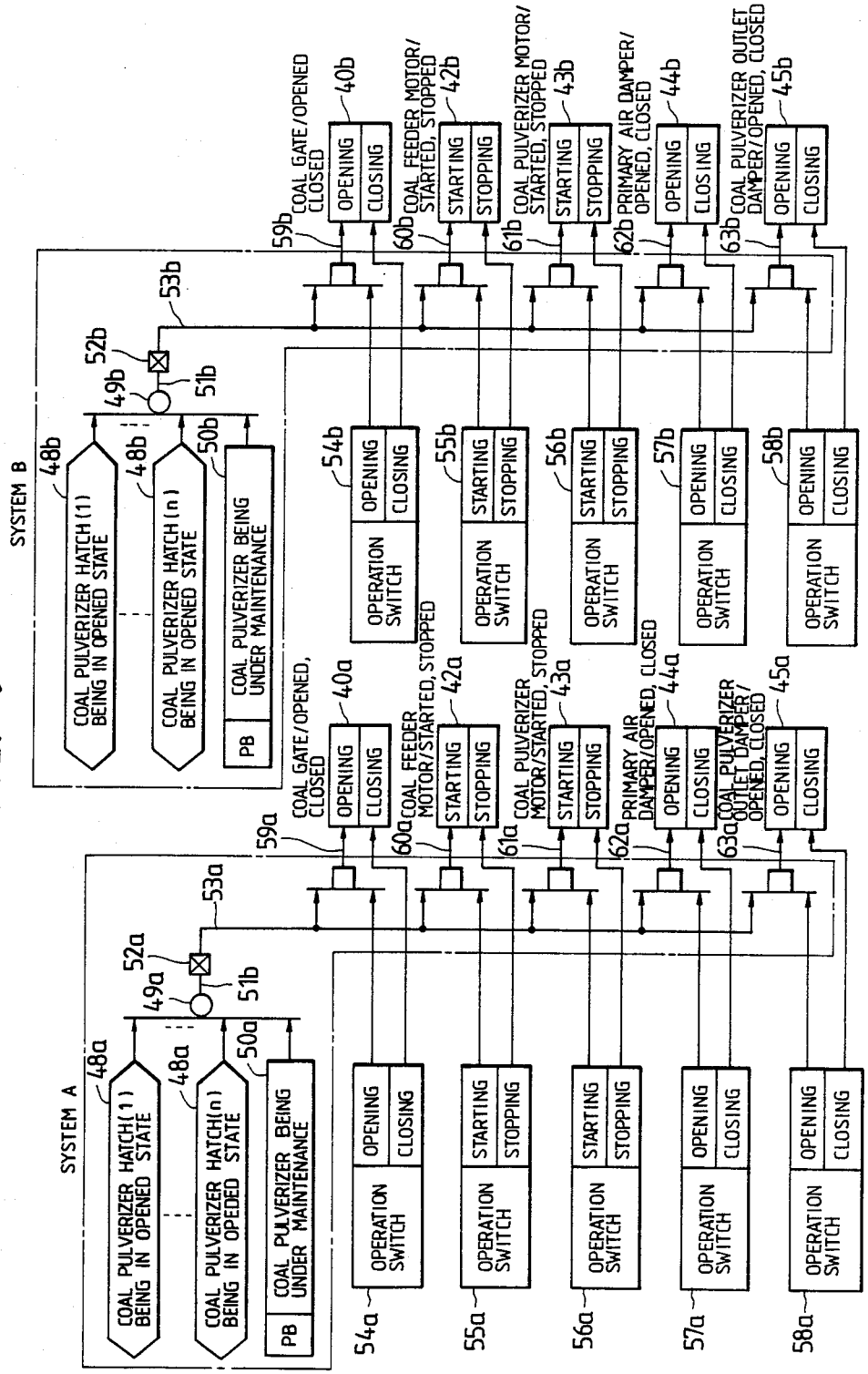
FIG. 9 shows an example of application of the safeguard arrangement to the coal pulverizer.

FIG. 9 shows the safeguard arrangement in the maintenance inside the coal pulverizer 38 shown in FIG. 8, and since both systems a and b are based on the same logic, a description will be made hereunder only on the example of the system a. Each of the coal pulverizer hatches 47a in a plurality is provided with a hatch opening detector 48a, and a coal pulverizer maintenance signal 51a is effectuated by an OR circuit 49a when the opened state of the hatches is detected by any one of said detectors 48a provided in a plurality or when a push button 50a for signaling the coal pulverizer being under maintenance is operated on the spot by the maintenance personnel. Said push button 50a may not be provided.

In the case when the coal pulverizer maintenance signal 51a is effectuated, a coal pulverizer operation permission signal 53, which is obtained by inverting said maintenance signal 51a by an NOT circuit 52a, is not effectuated. Therefore opening operation instruction signals 59a, 62a and 63a for the coal gate 40a, the primary air damper 44a and the coal pulverizer outlet damper 45a are not effectuated even if any of operation switches 54a, 57a and 58a corresponding to said apparatuses respectively is operated for opening, and consequently all of the aforesaid apparatuses do not make opening operation.

Even if either of operation switches 55a and 56a corresponding to the coal feeder motor 42a and the coal pulverizer motor 43a respectively is operated for starting, start instruction signals 60a and 61a for said motors are not effectuated, and consequently neither of these motors is started.

According to the present embodiment, the opening and starting operations of all of the auxiliaries 40a, 42a, 43a, 44a and 45a related to the coal pulverizer 38a can be prohibited during the maintenance of the coal pulverizer. This produces effects that such personal accidents as maintenance personnel being buried in the coal flowing into the coal pulverizer 38a, as the personnel being burnt or scalded by the hot air, flame or pulverized coal flowing into the coal pulverizer 38a and as the personnel being caught in and, in the worst case, caused to death by the rotation of the rotor 46a, owing to the erroneous operations of either of the operation switches 54a and 55a, either of the operation switches 57a and 28a, and the operation switch 56a, by an operator, respectively, are prevented from occurrence.

Figure 10:
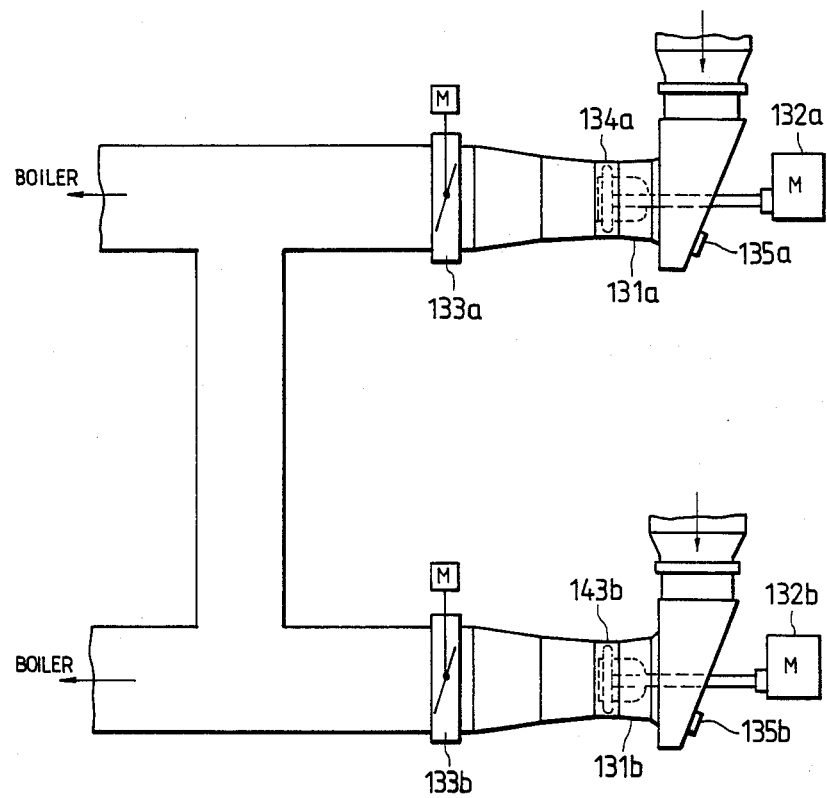
FIG. 10 is a system diagram related to a forced draft fan.

FIG. 10 is a system diagram of forced draft fans and auxiliaries related thereto for supplying air to a boiler, which are taken as one example of the plant auxiliaries. In order to subject the inside of a forced draft fan 131a of a system A maintenance while leaving a forced draft fan of a system B in the state of operation, in a forced draft fan system composed of a plurality thereof, a forced draft fan motor 132a is stopped, and a forced draft fan outlet damper 133a checking the backflow of air from the other forced draft fan is closed. On the occasion, a forced draft fan vane 134a is opened in the lowest degree. When the inside of forced draft fan 131a is subjected to maintenance, a forced draft fan manhole 135a is opened, and maintenance personnel enter the spot of maintenance therethrough.

Figure 11:
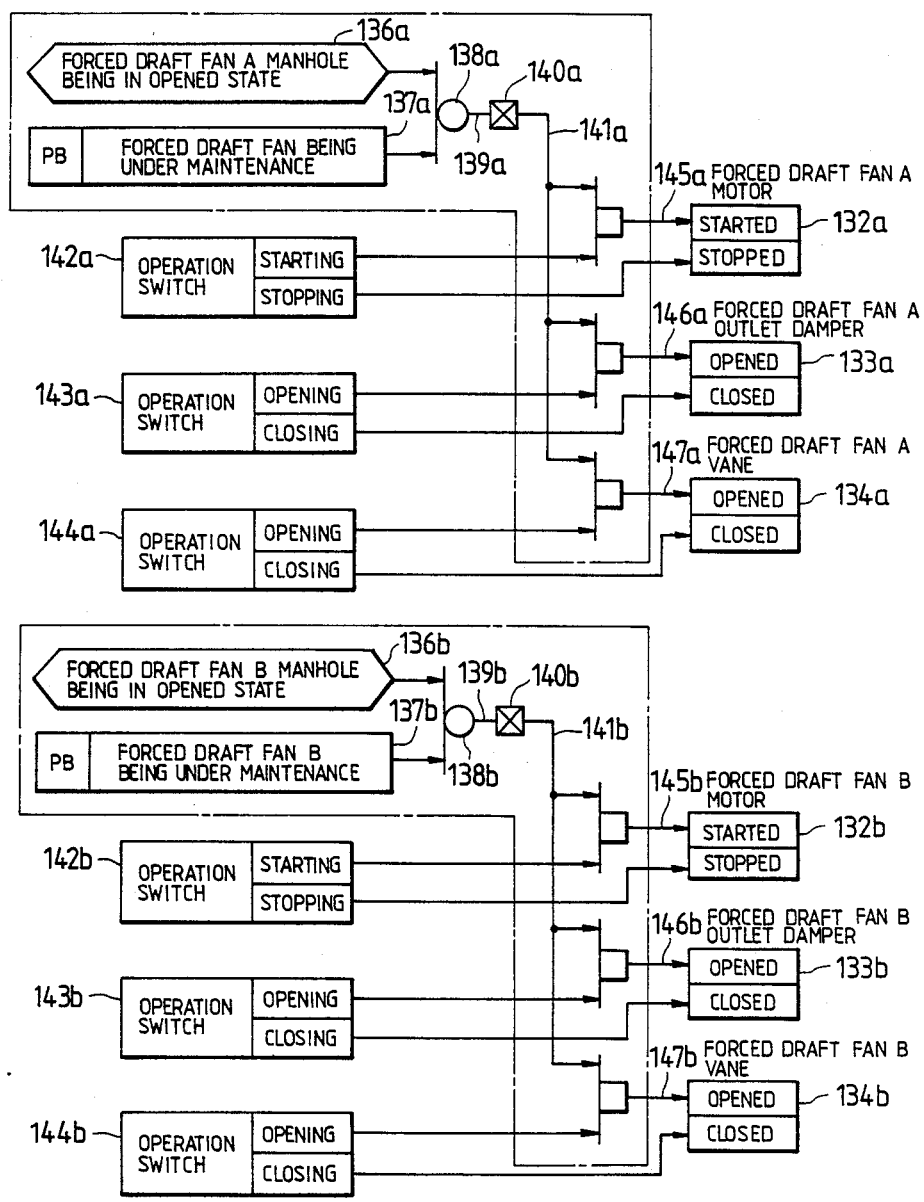
FIG. 11 shows an example of application of the safeguard arrangement to the forced draft fan.

FIG. 11 shows an example of application of a safeguard arrangement in the maintenance of the inside of the forced draft fan 131a shown in FIG. 10. The forced draft fan manhole 135a is provided with a cover opening detector 136a, and a forced draft fan maintenance signal 139a is effectuated by an OR circuit 138a when the opened state is detected by said detector 136a or when a push button 139a for signaling the forced draft fan being under maintenance is operated on the spot by the maintenance personnel. Said push button 137a may not be provided.

When the forced draft fan maintenance signal 139a is effectuated, a forced draft fan operation permission signal 141a, which is obtained by inverting said maintenance signal 139a by an NOT circuit 140a, is not effectuated. Therefore a start instruction signal 145a for the aforesaid motor 132a is not effectuated even if an operation switch 142a corresponding to the forced draft fan motor 132a is operated for starting, and consequently the motor 132a is not started. Even if either of operation switches 143a and 144a corresponding to a forced draft fan outlet damper 133a and the forced draft fan vane 134a respectively is operated for starting, opening operation instruction signals 146a and 147a for said auxiliaries are not effectuated, and consequently all of these auxiliaries do not make opening operation.

According to the present embodiment, the starting and opening operations of all the auxiliaries 132a, 133a and 134a related to the forced draft fan 131a can be prohibited during the maintenance of the forced draft fan. This produces effects that such personal accidents as maintenance personnel being caught in a movable element of the forced draft fan 131a and as the personnel being tumbled down or caught in the movable element, caused to death in the worst case, by the reverse rotations of the forced draft fan motor 142a and the vane 144a due to the backflow of air into the forced draft fan 131a, owing to erroneous operations of either of the operation switches 142a and 144a and the operation switch 143a by an operator, respectively, are prevented from occurrence.

Figure 12:
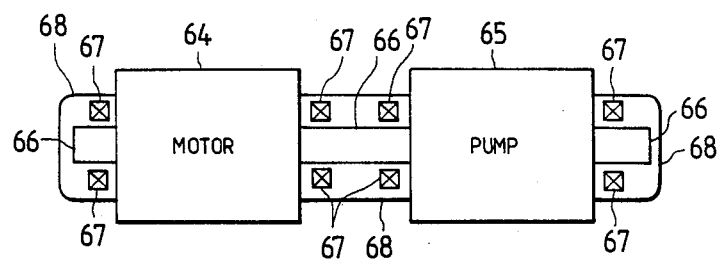
FIG. 12 is a schematic view of a pump and a motor.

FIG. 12 is a schematic view of a motor and a pump as plant auxiliaries. While the rotating elements of a motor 64 and a pump 65 are protected by casings or the like, a shaft coupling the motor 64 and the pump 65 together and a rotating shaft 66 in the end part or a bearing element 67 for supporting said rotating shaft 66 are covered with a plurality of rotary element covers 68. These covers 68 are removed on the occasion of maintenance of the motor 64, the pump 65, the rotating shaft 66 or the bearing element 67, and therefore the rotating shaft 66 and the bearing element 67 are exposed.

Figure 13:
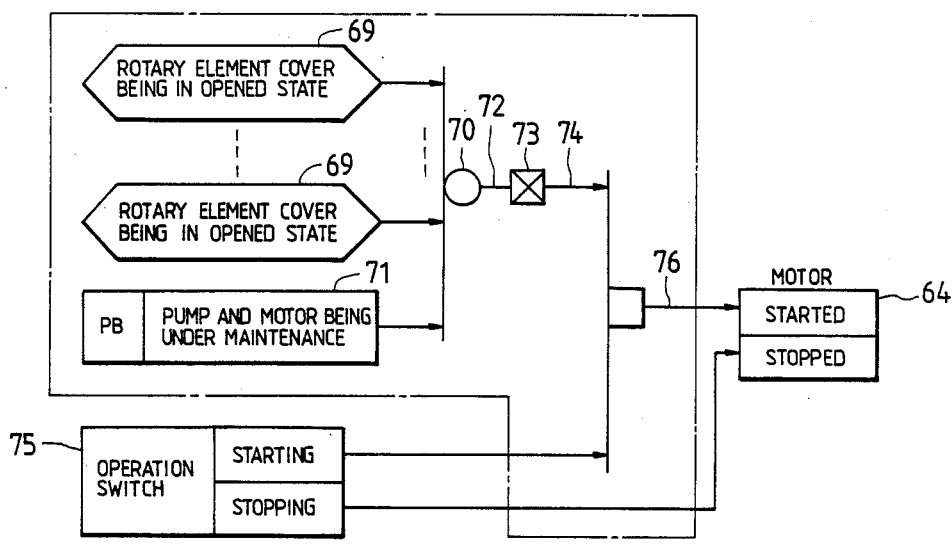
FIG. 13 shows an example of application of the safeguard arrangement to the pump and the motor.

FIG. 13 shows an example of application of safeguard arrangement in the maintenance of the motor 64, the pump 65, the rotating shaft 66 or the bearing element 67 shown in FIG. 12.

Each of the rotary element covers 68 in a plurality is provided with a cover opening detector 69, and a pump or motor maintenance state signal 72 is effectuated by an OR circuit 70 when the state of maintenance is detected by any one of said detectors 69 provided in a plurality or when a push button 71 for signaling the pump or the motor being under maintenance is operated on the spot by maintenance personnel. Said push button 71 may not be provided.

In the case when the pump or motor maintenance state signal 72 is effectuated, a motor start permission signal 74, which is obtained by inverting said maintenance state signal 72 by an NOT circuit 73, is not effectuated. Therefore a start instruction signal 76 for the motor 64 is not effectuated even if an operation switch 75 corresponding to the motor 64 is operated for starting, and consequently all of the motor 64, the pump 65, the rotating shaft 66 and the bearing element 67 do not rotate but remain at a standstill.

According to the present embodiment, the rotating motions of all the elements can be prohibited when any of the motor 64, the pump 65, the rotating shaft 66 and the bearing element 66 is subjected to maintenance, and this produces an effect that such a personal accident as maintenance personnel being caught in a rotating element is prevented even if an operation switch 75 is operated erroneously by an operator.

According to the present invention, it is possible to detect automatically that some plant apparatus and auxiliaries are under maintenance and thereby to prevent dangerous motions of relevant apparatuses due to erroneous operations, and therefore personal accidents can be prevented from occurrence.

The ideas described above with reference to figures ranging to 13 are premised on the thought that "peripheral apparatuses are stopped or closed", and accordingly the technological value thereof is derived from checking the start or opening of the peripheral apparatuses on the occasion of maintenance. In a plant, the stoppage or closure of the peripheral apparatuses is confirmed generally before maintenance is started. If it should be missed that some apparatuses are in the state of operation or opened, checking of the start or opening will lose its meaning, and safety can not be secured. In order to avoid this missing, it is effective to stop or close apparatuses forcibly when the state of maintenance (the release of locking of a cover or the opening of the cover mentioned with reference to FIGS. 2 and 3) is detected. However, this measure is not based on the thought that the occurrence of a dangerous state is prevented (i.e. the thought equivalent to that stated with reference to FIG. 1), but based on the thought close to that of averting the dangerous state quickly. It is desirable, therefore, to take the following three-step measure.

1. The state of closure or stoppage of peripheral apparatuses is confirmed without fail before maintenance is commenced.

2. The state of maintenance is detected and a forced stop or closure signal is delivered to the apparatuses.

3. The state of maintenance is detected and a start or opening checking signal is delivered to the apparatuses.

Next, the basic thought of the method of forced stop or closure stated in the above item 2 will be described by using FIG. 14.

Figure 14:
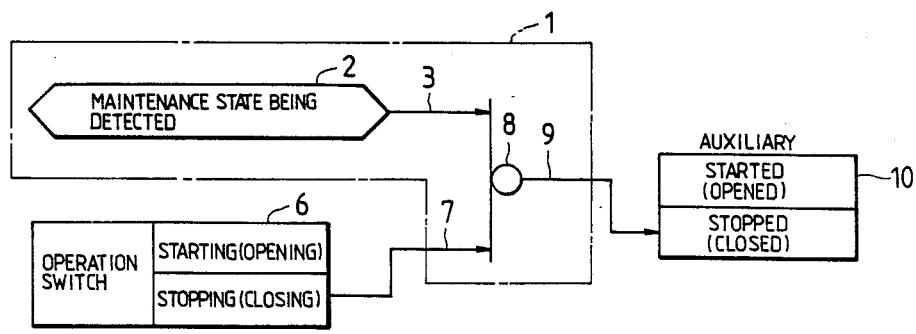
FIG. 14 shows another embodiment of the present invention.

Numeral 2 in FIG. 14 denotes a cover opening detector. The detail thereof is the same with that of the detector described with regard to FIGS. 2 and 3, and it gives an output 3 when a cover 102 is opened or when the locking of the cover is released. However, the arrangement of FIG. 14 is premised on an assumption that an apparatus is opened or operated, and it is intended to make switching over to the safety side. Therefore it can be assumed that a transient state of danger appears and thereby a measure is delayed, if the opening of the cover is detected on the occasion. It is preferable, accordingly, that the release of locking is detected. The output 3 is turned to be a stop or closure signal 9 through an OR circuit 8, and thereby an operation of stopping or closing the apparatus 10 is conducted. Besides, a stop (closure) instruction 6 of an operation switch 6 may also be impressed on the OR circuit 8.

The circuit of FIG. 14 is applicable also to concrete interlocking circuits of FIGS. 5, 7, 9, 11 and 13, and by applying both ideas of FIG. 1 and FIG. 14, a double safeguard arrangement can be obtained.

According to the present invention described above, the safety of maintenance personnel on the occasion of maintenance can be secured.

What is claimed is:

1. In a safeguard arrangement for a plant which comprises a plant auxiliary provided with a lid and so designed that the lid is opened for maintenance of the inside thereof, switching means installed on a piping connected to said plant auxiliary, and driving means to give a driving output to the switching means in response to an opening or closing instruction signal for said switching means, and which is employed when operations for maintenance of the aforesaid plant auxiliary are executed, a safeguard arrangement for a plant which is provided additionally with lid opening detecting means to detect the opening of the lid of the aforesaid plant auxiliary or the release of locking means thereof, in gearing with either of them, and checking means to check the opening of the aforesaid switching means on the basis of the opening instruction signal for the switching means when it is detected by said lid opening detecting means that the lid is opened or to be opened.

2. In a safeguard arrangement for a plant which comprises a plant auxiliary provided with a cover and so designed that the cover is opened for maintenance of the inside thereof, a rotor installed inside of said plant auxiliary or on a piping connected thereto, and driving means to give a driving output to said rotor in response to a start or stop instruction signal for the rotor, and which is employed when operations for maintenance of the aforesaid plant auxiliary are executed, a safeguard arrangement for a plant which is provided additionally with cover opening detecting means to detect the opening of the cover of the aforesaid plant auxiliary or the release of locking means of the cover, in gearing with either of them, and checking means to check the start of the rotor on the basis of the start instruction signal for said rotor when it is detected by said cover opening detecting means that the cover is opened or to be opened.

3. In a safeguard arrangement for a plant which comprises a plant auxiliary provided with a cover and so designed that the cover is opened for maintenance of the inside thereof and wherein a fluid or the like is supplied into and discharged out of the plant auxiliary through blocking means, a safeguard arrangement for a plant which is provided additionally with cover opening detecting means to detect the opening of the cover of the aforesaid plant auxiliary or the release of locking means of the cover, in gearing with either of them, and checking means to prohibit the opening of the aforesaid blocking means when it is detected by said cover opening detecting means that the cover is opened or to be opened.

4. In the safeguard arrangement for a plant which comprises a plant auxiliary provided with a cover and so designed that the cover is opened for maintenance of the inside thereof, switching means installed on a piping connected to said plant auxiliary, and driving means to give a driving output to said switching means in response to an opening or closing instruction signal for the switching means, and which is employed when operations for maintenance of the aforesaid plant auxiliary are executed, a safeguard arrangement for a plant which is provided additionally with a cover opening detecting means to detect the opening of the cover of the aforesaid plant auxiliary or the release of locking means of the cover, in gearing with either of them, and forcibly closing means to give a signal of closing the switching means forcibly to the aforesaid driving means when it is detected by said cover opening detecting means that the cover is opened or to be opened.

5. In the safeguard arrangement for a plant which comprises a plant auxiliary provided with a cover and so designed that the cover is opened for maintenance of the inside thereof, a rotor installed inside of said plant auxiliary or on a piping connected thereto, and driving means to give a driving output to said rotor in response to a start or stop instruction signal for the rotor, and which is employed when operations for maintenance of the aforesaid plant auxiliary are executed, a safeguard arrangement for a plant which is provided additionally with a cover opening detecting means to detect the opening of the cover of the aforesaid plant auxiliary or the release of locking means of the cover, in gearing with either of them, and forcibly stopping means to give a signal of stopping the aforesaid rotor forcibly to the driving means for the rotor when it is detected by said cover opening detecting means that the cover is opened or to be opened.

6. In the safeguard arrangement for a plant which is a plant auxiliary provided with a cover and so designed that the cover is opened for maintenance of the inside thereof and wherein a fluid or the like is supplied into and discharged out of the plant auxiliary through blocking means, a safeguard arrangement for a plant which is provided additionally with a cover opening detecting means to detect the opening of the cover of the aforesaid plant auxiliary or the release of locking means of the cover, in gearing with either of them, and forcibly closing means to give a signal of closing the aforesaid blocking means forcibly when it is detected by said cover opening detecting means that the cover is opened or to be opened.

* * * * *